United States Patent [19]

Scholz et al.

[11] Patent Number: 4,572,936

[45] Date of Patent: Feb. 25, 1986

[54] SUBMERGED ARC WELDING PROCESS

[75] Inventors: Erhard Scholz, Eisenberg, Fed. Rep. of Germany; Edmund Heimann, Dietlikon; Hans Baach, Niederglatt, both of Switzerland

[73] Assignee: Schweissindustrie Oerlikon Buhrle AG, Switzerland

[21] Appl. No.: 581,717

[22] Filed: Feb. 21, 1984

[30] Foreign Application Priority Data

Feb. 19, 1983 [EP] European Pat. Off. ........ 83101612.6

[51] Int. Cl.⁴ .............................................. B23K 9/18
[52] U.S. Cl. .................................... 219/73.2; 219/73; 219/137 R
[58] Field of Search ................. 219/73.2, 73 R, 137 R

[56] References Cited

U.S. PATENT DOCUMENTS 3,748,429 7/1973 Agusa et al. ...................... 219/73 R
4,214,141 7/1980 Okuda et al. ...................... 219/73 R

FOREIGN PATENT DOCUMENTS 2326442 12/1974 Fed. Rep. of Germany .
2084501A 4/1982 United Kingdom .
2090615A 7/1982 United Kingdom .

*Primary Examiner*—C. L. Albritton
*Assistant Examiner*—Alfred S. Keve
*Attorney, Agent, or Firm*—Roylance, Abrams, Berdo & Goodman

[57] ABSTRACT

In a submerged arc multiple wire welding system, only one or two of the welding wires used are over or microalloyed wires. The other wires are commercially available unalloyed or low-alloyed solid wires. The process produces a weld metal which has unexpectedly high toughness values, and can be performed more economically. This multiple wire welding system is used in single or multiple-pass welding operations.

20 Claims, 9 Drawing Figures

FIG. 1a 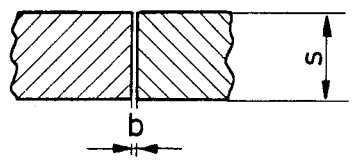 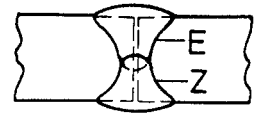 FIG. 1b
FIG. 2a 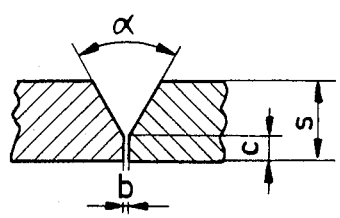 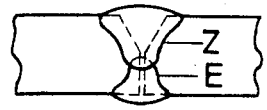 FIG. 2b
FIG. 3a 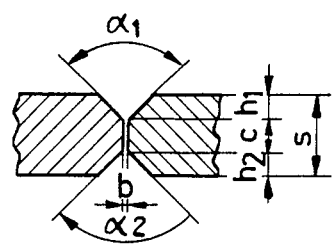 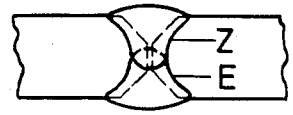 FIG. 3b

SUBMERGED ARC WELDING PROCESS

FIELD OF THE INVENTION

The present invention relates to a process for submerged arc welding employing a plurality of welding wires.

BACKGROUND OF THE INVENTION

A large number of welding operations are performed by the so-called "two pass" method. This is the most economical submerged arc welding method to join plates in a thickness range of 3 to 40 mm. The weld preparation is very simple, and in most cases a flame cut is sufficient. In the upper thickness range of approximately 16 to 25 mm, welding is generally carried out by the so-called "Y-weld", which facilitates adapting the welding data to the penetration depth of the arc. A third possible weld, particularly intended for materials with high plate thickness, is the double-Y-weld. The best known and economically most important uses of this third type of submerged arc welding is in ship building and in the manufacture of large pipes for transporting gases and liquids. Over the last few years, particular importance has been attached to the manufacture of large pipes for transporting natural gas and petroleum.

Submerged arc welded pipes are now being laid in regions subjected to particularly low temperatures in winter. Consequently, the pipe material and the welds have high toughness requirements at such low temperatures. Such toughness requirements are generally expressed in notch impact values, determined with Charpy V-notched specimens at temperatures between −20 and −60° C.

Only since the 1970's have single-pass and two-pass welds been used in the manufacture of such pipes to produce the necessary quality. Previously, such welds had a microstructure much too coarse to obtain good notch impact values.

The discovery of the action of microalloys, particularly the action mechanism of small contents of Ti and B in combination with minimum contents of oxygen and nitrogen, permitted production of large single-pass and two-pass welds with very high toughness values at low temperatures. During the solidification and cooling process of the weld, these microalloying elements form a high proportion of acicular ferrite, instead of the coarse and brittle proeutectoid ferrite. Acicular ferrite is responsible for and a prerequisite for high toughness levels at low temperatures.

A very large number of publications have appeared over the last 13 years in this very important field of welding metallurgy. The International Institute of Welding (IIW) has also carried out extensive research in connection with this phenomenon. Such welds now form part of the prior art, e.g., Swiss Patent Application No. 9592/80.

The alloying of titanium and boron into the submerged arc welds is carried out with different methods, as follows:

(a) alloying the solid wire or wires using a welding powder giving low oxygen and nitrogen values;

(b) alloying a filler wire which is then used in the same way as a solid wire for submerged arc welding; or (c) using a welding powder which alloys all or part of the necessary microalloying elements into the weld metal during the welding process, while using a standard, commercially available welding wire without microalloying elements.

Applicant's assignee has been producing filler wires according to method (b) for a number of years. Applicants consider this method to be the most accurate method for supplying the very small contents of microalloying elements in a metallurgically effective manner to the welding process (see Swiss Patent Application No. 9592/80).

The use of multiple wire welding is increasing in the manufacture of pipelines according to the spiral or longitudinal weld system. In multiple wire welding, a plurality of identical wires or electrodes are arranged in single file during submerged arc welding. Although each individual welding wire generally produces its own arc, the weld pools of all the participating wires combine into a single pool. The multiple wire arrangement permits use of plural thinner wires, in lieu of a single thicker wire, thereby facilitating higher welding speeds. According to the rule of thumb, two wires double the possible welding speed, three wires triple it, and four wires quadruple it. The use of more than four wires is not usual within the present state of the art.

According to the presently conventional methods, one to four identical microalloyed filler wires or solid wires are used for welding single and two-pass welds. These conventional methods are relatively expensive because microalloyed filler or solid wires are much more expensive than standard submerged arc welding wires. However, due to the much higher quality required for the welds, the higher priced microalloyed wires have to be used.

SUMMARY OF THE INVENTION

According to the present invention, in multiple wire submerged arc welding, the microalloying elements are supplied by a single wire. In the case of a four-wire welding process, the required microalloying elements can be satisfied by a maximum of two wires. The remaining wires used in multiple wire welding are in the form of inexpensive, commercially available wires.

The process of the present invention is significantly more economical because the cost of unalloyed solid wire suitable for submerged arc welding is approximately only 30 percent of the cost of microalloyed filler wire. In the case of four-wire welding, this would lead to a considerable reduction in the wire cost.

The tests conducted on this process have surprisingly shown that the effectiveness of the microalloying elements is clearly reinforced by the special manner of the concentrated injection into the weld metal. The notch impact values obtained are well above those of welds with the same microalloyed welding wires. The microstructure of the welds have a higher acicular ferrite content than welds made by multiple wire welding with three normally alloyed Ti and B-containing filler wires.

Certain importance is attached to the position of the microalloyed filler wire when carrying out the welding process according to the invention. Most favorable results are obtained if the microalloyed filler wire or electrode is positioned as the first welding head. The increased metallurgical effectiveness of the microalloying elements is probably due to the rising of the active alloying elements from the cavity base (i.e., base material or weld metal fusion line) such that the alloying elements have a particularly intense metallurgical influence in the first melting phase on the particularly critical molten base material (which represents 50 to 80% of the total weld metal).

The most important process in this type of welding is the hardening of the free nitrogen by means of the metallic boron traces. A weld metal treated in this way is relatively insensitive to its oxygen content. Thus, it permits the use of neutral or at least less basic welding powder giving a weld metal with a higher oxygen content. Such welding powder is normally accompanied by a higher welding speed and a higher welding current, permitting higher deposit efficiencies.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIGS. 1a and 1b are side elevational views of an I-weld;

FIGS. 2a and 2b are side elevational views of a Y-weld;

FIGS. 3a and 3b are side elevational views of a double Y-weld; and

DETAILED DESCRIPTION OF THE PREFERRED EMBODIMENTS

Referring initially to FIGS. 1a to 3b, the various weld shapes are illustrated with the corresponding weld passes. In each instance, a first pass E is followed by a second pass Z.

In FIGS. 1a to 3b, the plates to be welded are spaced by a distance b and have thickness s. The Y-weld of FIGS. 2a and 2b, has upper portion defining an angle $\alpha$ and a lower portion having a height c. The double Y-weld of FIGS. 3a and 3b comprises an upper portion defining an angle $\alpha_1$ and having a height $h_1$, a lower portion defining an angle $\alpha_2$ and having a height $h_2$, and an intermediate portion separating the upper and lower portions by a distance c.

Figure 4:
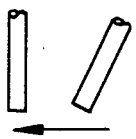
FIGS. 4, 5 and 6 are side elevational views of two, three and four wire welding systems, respectively, according to the present invention.
Figure 5:
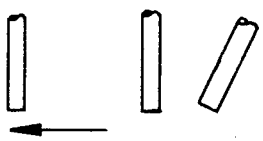
Figure 6:
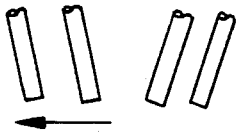

In FIGS. 4-6, two, three and four wire welding systems are illustrated. In each instance, the welding wires or electrodes are arranged in a single file. In the two and three wire systems of FIGS. 4 and 5, the over-microalloyed wire is the first welding wire in the welding direction. In the four wire system of FIG. 6, the microalloyed or overalloyed wires are the first and third welding wires in the welding direction. The remaining wires are standard unalloyed or low-alloyed solid wires. An over-microalloyed wire is a wire having a microalloy elements concentration greater than the desired microalloy elements concentration in the resulting weld. Each system has an alloying factor defined by the total number of welding wires divided by the number of over-microalloyed wires. The flux can be analytically neutral (i.e., causes little or no effect on the chemical composition of the weld relative to the unalloyed or low-alloyed wires), or can include microalloying elements.

The following Examples illustrate the results obtained with such microalloyed filler wires. In each of the five Examples the submerged arc welding process was performed on an X 60 mod. pipe steel according to API, welding in each case taking place in two passes. The plate thickness was 19.1, mm.

In the Examples, the following filler wires were used having pure weld metal with the compositions specified:

Wire A (Fluxocord 35.22) is used for 1, 2, 3 or 4 wire welding according to conventional methods as normal microalloyed filler wire, and is composed of
C: 0.05%
Mn: 1.2%
Si: 0.2%
Cr: 0.4%
Mo: 0.2%
Ti: 200 ppm
B: 40 ppm Wire B (Fluxocord 35.22D) is used for two wire tandem welding or four wire welding according to the process of the present invention, and is composed of
C: 0.05%
Mn: 1.9%
Si: 0.3%
Cr: 0.8%
Mo: 0.4%
Ti: 400 ppm
B: 80 ppm Wire C (Fluxocord 35.22-3D) is used for three wire welding according to the process of the present invention, and is composed of
C: 0.05%
Mn: 2.6%
Si: 0.4%
Cr: 1.2%
Mo: 0.6%
Ti: 600 ppm
B: 120 ppm Wire D is commercially available S1 wire, and is composed of
C: 0.07%
Mn: 0.5%
Si: 0.1% (max)

EXAMPLE 1

A weld was formed with a three wire welding system employing three microalloyed wires of the Wire A type. Welding powder OP 122 was used. The first wire was connected to 810 A at 30 V. The second wire was connected at 790 A at 33 V. The third wire was connected to 680 A at 34 V. The welding speed was 125 cm/min. The notch impact strength in Joules, according to ISO-V at −20° C, was 42/48/48.

EXAMPLE 2

A weld was formed with a three wire welding system employing three microalloyed wires of the Wire A type. Welding powder OP 121 was used. The first wire was connected to 810 A at 30 V. The second wire was connected at 790 A at 33 V. The third wire was connected to 680 A at 34 V. The welding speed was 125 cm/min. The notch impact strength in Joules, according to ISO-V at −20° C., was 37/40/74.

EXAMPLE 3

A weld was formed with a four wire welding system employing two microalloyed filler wires of the Wire B type (first and third wires) and two solid wires of the Wire D type (second and fourth wires). The welding powder was OP 121 TT. The first wire was connected to 700 A at 32 V. The second wire was connected to 650

A at 32 V. The third wire was connected to 600 A at 35 V. The fourth wire was connected at 550 A at 33 V. The welding speed was 130 cm/min. The notch impact strength in Joules, according to ISO-V at −20° C. was 95/108/116.

EXAMPLE 4

A weld was formed with a three wire welding system employing one microalloyed wire of the Wire C type (first wire), and two unalloyed wires of the Wire D type (second and third wires). Welding powder OP 121 TT was used. The first wire was connected to 810 A at 30 V. The second wire was connected at 790 A at 33 V. The third wire was connected to 680 A at 34 V. The welding speed was 125 cm/min. The notch impact strength in Joules, according to ISO-V at −20° C., was 96/100/102.

EXAMPLE 5

A weld was formed with a three wire welding system employing one microalloyed wire of the Wire C type (first wire), and two unalloyed wires of the Wire D type (second and third wires). Welding powder OP 122 was used. The first wire was connected to 810 A at 30 V. The second wire was connected at 790 A at 33 V. The third wire was connected to 680 A at 34 V. The welding speed was 125 cm/min. The notch impact strength in Joules, according to ISO-V at −20° C., was 154/158/160.

The results of the above five Examples permit three conclusions to be drawn. First, the standard type Fluxocord 35.22 used in the multiple wire process produces a less favorable result than the combination of over-microalloyed filler wires and unalloyed solid wires. Thus, the combination according to the present invention provides a definite advance in the art. Second, the use of powder OP 121 TT (degree of basicity 3) and OP 122 (degree of basicity 2) fail to prove that higher basicity, and therefore, lower oxygen content of the weld metal are advantageous. Third, over-microalloyed filler wires B and C can be used in numerous different ways. Combination ratios of the over-microalloyed wires to the standard solid filler wires of 1:2 or 2:2 are possible. A test with a combination ratio 1:3 in 4-wire welding also gave good results.

While various embodiments have been chosen to illustrate the invention, it will be understood by thosed skilled in the art that various changes and modifications can be made therein without departing from the scope of the invention as defined in the appended claims.

What is claimed is:

1. A process for submerged arc welding, comprising the steps of:
   providing granular flux in an area to be welded;
   electrically coupling a plurality of welding wires to a source of electrical energy, at least one of the welding wires being an over-microalloyed wire, the remaining welding wires being of the group consisting of unalloyed and low-alloyed solid wires; and
   supplying electrical energy to the welding wires simultaneously.

2. A process according to claim 1 wherein, with an alloying factor of 2, the ratio of the number of over-microalloyed wires to the number of remaining wires is 1:1.

3. A process according to claim 1 wherein, with an alloying factor of 3, the ratio of the number of over-microalloyed wires to the number of remaining wires is 1:2.

4. A process according to claim 1 wherein, with an alloying factor of 4, the ratio of the number of over-microalloyed wires to the number of remaining wires is 1:3.

5. A process according to claim 1 wherein, with an alloying factor of 2, the ratio of the number of over-microalloyed wires to the number of remaining wires is 2:2.

6. A process according to claim 1 wherein, with an alloying factor of 1.5, the ratio of the number of over-microalloyed wires to the number of remaining wires is 2:1.

7. A process according to claim 1 wherein the over-microalloyed wire is a solid wire.

8. A process according to claim 1 wherein the over-microalloyed wire is a filler wire comprising a filler with microalloying components.

9. A process according to claim 1 wherein said flux is analytically neutral.

10. A process according to claim 1 wherein said flux comprises microalloying components.

11. A process according to claim 1 wherein a weld metal structure is produced with a high proportion of acicular ferrite.

12. A product obtained by the process of claim 11.

13. A process according to claim 11 wherein the surface proportion of acicular ferrite is at least 60 percent.

14. A product obtained by the process of claim 13.

15. A process according to claim 11 wherein a single welding pass is performed.

16. A process according to claim 11 wherein a plurality of welding passes are performed.

17. A product obtained by the process of claim 1.

18. A process for submerged arc welding, comprising the steps of:
   providing granular flux in the area to be welded;
   electrically coupling first and second sets of welding wires to a source of electrical energy, said first set of welding wires being over-microalloyed wires, said second set of welding wires being of the group consisting of unalloyed or low-alloyed solid wires, the number of wires in said first set being at least one and less than or equal to the number of wires in said second set; and
   supplying electrical energy to the welding wires simultaneously.

19. A process according to claim 18 where one of the over-microalloyed wires is first in a welding direction.

20. A product obtained by the process of claim 18.

* * * * *